Dec. 27, 1966  G. A. LUNING  3,293,996
FILM RECORD CARDS AND METHOD FOR MAKING THE SAME
Filed Nov. 26, 1963  5 Sheets-Sheet 2

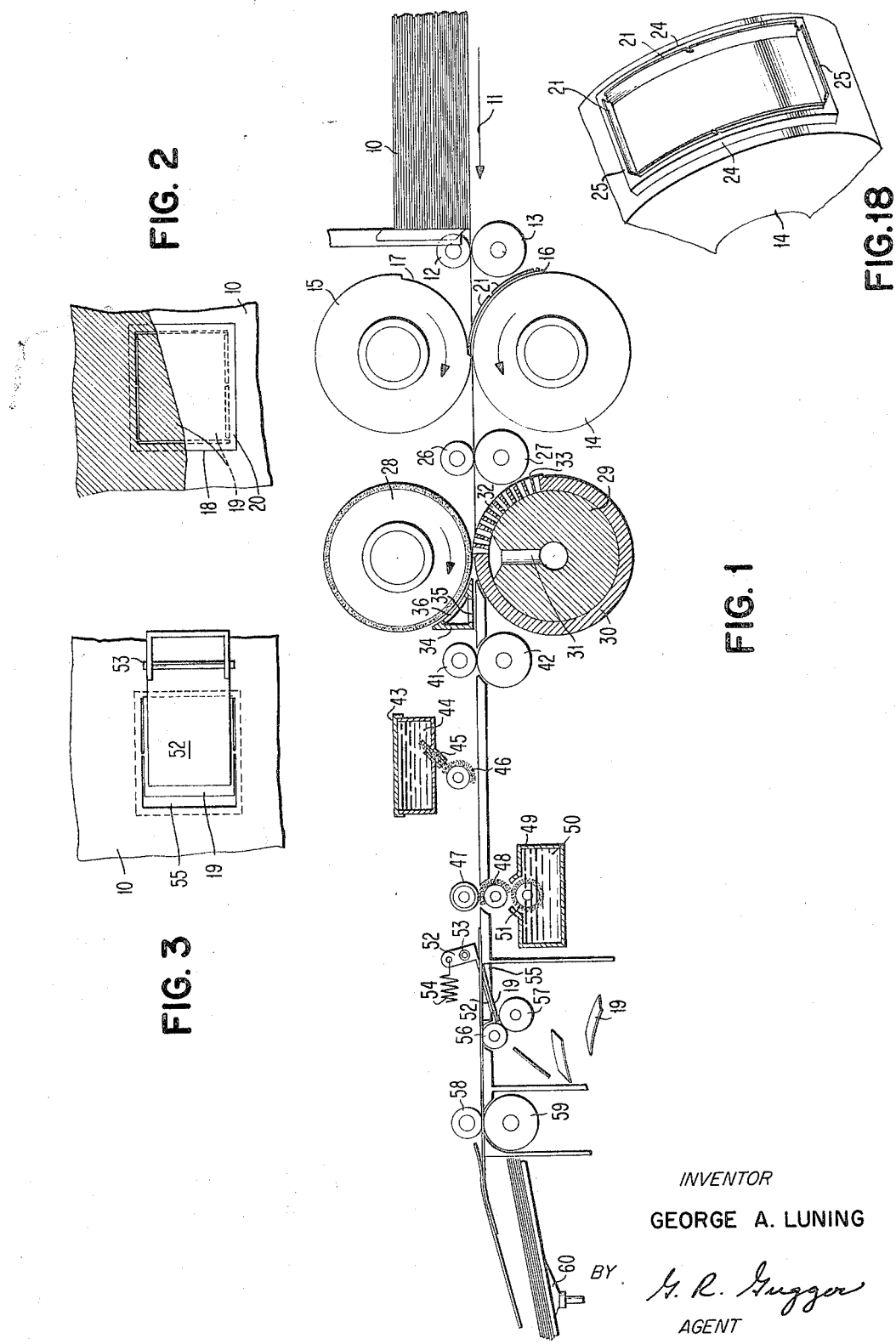

Dec. 27, 1966  G. A. LUNING  3,293,996
FILM RECORD CARDS AND METHOD FOR MAKING THE SAME
Filed Nov. 26, 1963  5 Sheets-Sheet 4

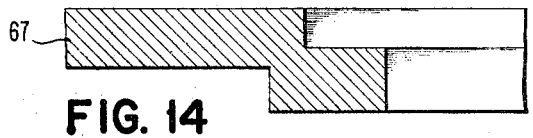
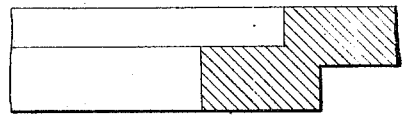
FIG. 14
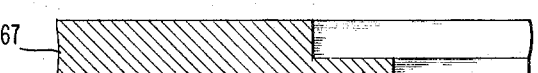
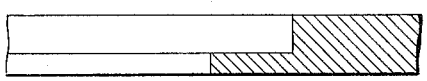
FIG. 15
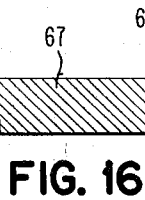
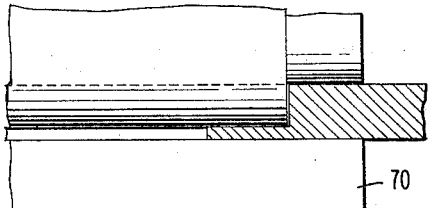
FIG. 16
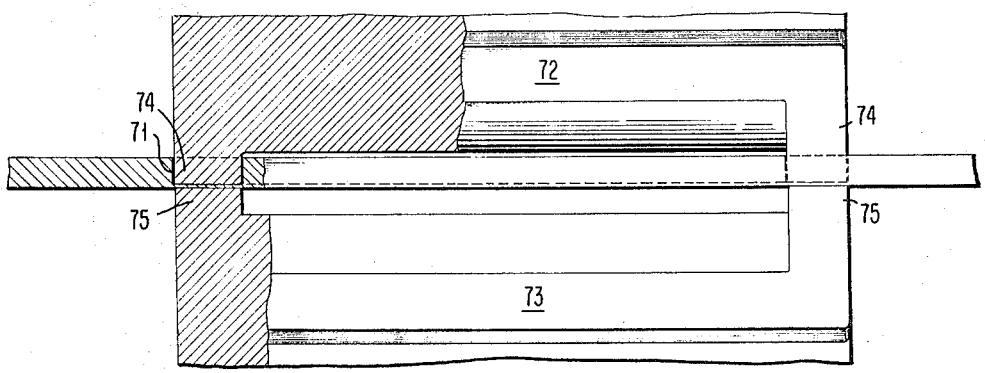
FIG. 17
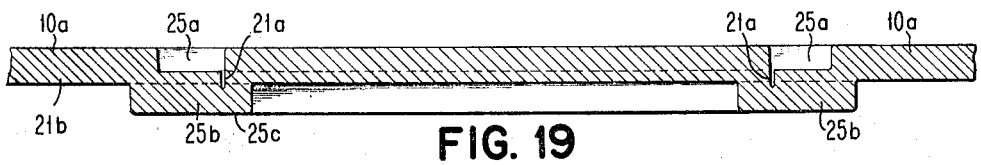
FIG. 19

United States Patent Office 3,293,996
Patented Dec. 27, 1966

3,293,996
FILM RECORD CARDS AND METHOD FOR MAKING THE SAME
George A. Luning, Endicott, N.Y., assignor to International Business Machines Corporation, New York, N.Y., a corporation of New York
Filed Nov. 26, 1963, Ser. No. 326,182
4 Claims. (Cl. 93—1)

This invention relates to film record cards in which individual microfilm sections are mounted to facilitate the handling, filing, sorting, projection and storage of the film sections and more particularly to an improved and novel method for manufacturing aperture cards adapted for such uses.

The present invention is particularly useful in the manufacture of film record cards which are capable of being sorted mechanically or electrically as, for example, the well-known IBM card and system in which the cards are perforated according to a code and are sorted by electrically controlled apparatus responsive to the location of the perforations in the individual cards. Aperture cards of this type are in extensive use, particularly by the United States Government, with the annual usage of such cards running well up into the millions.

One of the main problems attendant with the manufacture and use of aperture cards which are machine processible is the requirement that the record card should have the film or the like mounted therein and secured thereto by suitable adhesive material with no portion of the film projecting beyond the card on either side so that the cards may pass through the machine without the film inserts getting caught and torn loose. It is also essential that cards be provided in which a film or the like may be mounted in a manner so as not to increase the thickness of any portion of the card. Any increase in thickness of such cards is very undesirable because even though the increase in thickness around the aperture area of each card may be extremely small, say for example .001 of an inch, when a deck of hundreds of cards are stacked in the feed hopper of a record controlled machine there will be substantial difference in the height of one side of the stack as compared with the other and improper feeding of the cards will likely result.

In attempting to solve the problem of mounting film inserts so that they will be flush with the card surface, the prior art, as best exemplified by the Langan U.S. Patents Nos. 2,512,106; 2,587,022; 2,633,655 and 2,859-550, has made use of a depression or shoulder which is embossed in the cardstock surrounding the aperture. The film insert may be adhered directly to the shoulder or to a film mounting sheet which is adhered to the shoulder. Although cards provided with such a depression did advance the art, they were not without shortcomings due to the fact that simply embossing or compressing the cardstock does not result in a depression or shoulder of sufficient depth to satisfactorily accommodate a film insert.

The thickness of the cards commonly used in electrical card-handling machines is .007 inch and the thickness of the film may vary from the thickness of diazo film which is approximately .003 inch to the silver halide film thickness of .005 to .0055 inch. Additionally, allowance must be made to take care of the thickness of the adhesive substance used to secure the film. It can be seen then that for straight-forward mounting of a silver halide film insert onto an adhesive coated shoulder, it becomes necessary to compress the cardstock surrounding the aperture to a depth of .006 inch leaving a shoulder of .001 inch thickness. As a practical matter, it has been found that it is impossible to compress the present standard cardstock, which has a basis weight of 99 pounds per 3000 quare feet and a thickness of approximately 0.007 inch, to a depth sufficient for the insertion of film having a thickness of at least 0.0025 inch without deforming or pushing out the reverse side of the card. This is because the density of the compressed portion would then exceed the density of solid cellulose.

In view of this major problem relative to the compressibility of cardstock, the prior art has been concerned with various means for mounting the film insert in a card provided with a compressed shoulder having a depth of from .001 to .002 inch. As disclosed in the Langan U.S. Patent No. 2,512,106 mentioned above, use is made of an apertured sheet of pressure sensitive adhesive material secured to a compressed shoulder surrounding the card aperture and having a depth of 0.0015 inch. A narrow section of the sheet extends into the aperture with exposed adhesive thereon for subsequent mounting of a transparency in the aperture which has a depth of 0.0055 inch. This exposed adhesive is covered by a temporary sheet of glassine paper or similar material. Although this card could accommodate the relatively thick film, it proved to be objectionable in that the operations involved in preparing the blank cards, i.e., punching out the apertures and then applying the adhesive strips and the cover sheets, as well as the operations involved in finishing the cards including stripping off the cover sheets and disposing of them and then applying the transparencies to the exposed adhesive strips, both require objectionably elaborate and expensive apparatus which many users of aperture cards cannot justify the expense of purchasing and maintaining.

Another mode advanced by the above-mentioned Langan U.S. Patents Nos. 2,587,022 and 2,859,550 suggests heat bonding of thermoplastic materials to the card, proposing to cover the aperture with a sheet of cellulose acetate and to bond its edges by heat and pressure to the edges of the card around the aperture. The material of this cover sheet was proposed to be the same as or similar to that of the base of the film itself, with the thought that subsequently the film section and the cover sheet could be united integrally by heat and pressure to form a unitary transparency across the aperture. Although this card also accommodated the relatively thick film and eliminated the problem of using pressure sensitive adhesive and cover sheets, usually heat damage to the film resulted, such as clouding and/or buckling or warping of the film. Moreover, the bond formed by heating the cellulose acetate mounting sheet and pressing it into contact with the card, or by doing the same thing to the edges of the cellulose acetate base of the film itself, as suggested in the Langan U.S. Patent 2,633,655, was unsatisfactory. If the degree of heat was only enough to soften the cellulose acetate it would not penetrate the fibers of the card and the bond was weak and unsatisfactory. Attempts to increase fluidity by raising the temperature usually caused warping or buckling of the card itself.

It became apparent then that an aperture card had to be produced which would not only accommodate the relatively thick silver film but which would also make it possible to mount the film thereon without the use of mounting sheets, cover sheets, or undue heat and pressure. In meeting this problem, the present invention makes use of a special procedure which involves both embossing and grinding. It has been found that grooving or indentation of the card on one side can easily be made much deeper by permitting the card to be embossed on the other side, the stamping or embossing operation producing a sort of bending or folding of the card material instead of compression thereof. The next step according to the present invention is to remove the ridge-like embossed projection from the opposite surface of the card in any suitable manner so as to restore the surface of this side of the card to a planar condition. This can be accomplished by any suitable cutting or shaving operation, but most conveniently by high speed grinding or abrasion applied to the cards while moving relatively past the grinding device. This produces a card which is substantially planar over one side, and is planar on the other side as well except that a depression is formed having an area and depth depending upon the area and thickness of a film to be mounted. When the central portion of the card material in the depressed area is eventually cut out to form the aperture, the combined thickness of the film and of the ledge around the aperture is not any more than the thickness of the card. By way of example, a card initially 0.007 inch thick may be embossed and ground to a web thickness of 0.001 inch in the bottom of the depression and the added thickness of the usual silver halide film of say 0.0055 inch plus a suitable adhesive coating on the ledge makes a total of 0.007 inch.

It will be understood that the depth to which the blank cards are stamped or embossed, and the corresponding thickness of the card material at the bottom of the depression may vary depending upon the kind of film to be mounted, the web being, for example, from about 0.004 inch to about 0.001 inch for film varying in thickness within the range stated above.

To facilitate the formation of the aperture, either during manufacture of the card before shipment to the customer or by the customer after shipment, the embossing operation is combined with a scoring operation whereby as the card is being embossed, suitable scoring knives cut an interrupted score through the card around the perimeter of the aperture area that is to be removed. The scored area then may be simply pushed out to form the aperture.

After the grinding operation, a suitable sealant may be applied to the ground area to arrest the grinding lint. The sealant may be applied in any suitable manner such as through the use of a gravure roller. A gravure roller may also be used to apply any suitable heat-activatable adhesive to the thinned strip-form sections of the card which are formed by the above embossing and grinding operations. When it comes to the operation of mounting the film section, the aperture in the card is first cut out, after which the film section is placed in registry with the aperture and with its edges overlapping the adhesive-coated thin ledges around the aperture, then the film and card are pressed together around the overlapping edges while at the same time just enough heat is applied to activate the adhesive. Of course, a pressure-sensitive adhesive could be used, if desired.

In the novel method set forth above, it may be preferred to employ an embossing die which will produce around the outline of the aperture eventually to be cut out a trench-like depression, the bottom of which is formed by a thin web of card material. The interrupted score which defines the card area to be removed, would be disposed around the inner periphery of the bottom of the formed trench or groove. The grinding operation and the sealant and adhesive coating applications would conform with the configuration of the trench-like depression.

In a second embodiment of the present invention, a rolling step is added which it was found would increase the rigidity and strength of the thinned strip-form sections of the card which are formed by the combined embossing and grinding operations. In this embodiment, a card having a thickness of .007 inch, for example, is first embossed to form a depression having a depth of .005 inch and an area depending on the area of the film to be mounted with the cardstock on the reverse side of the card being displaced outward. Simultaneously with the embossing or following it, a central portion of the depressed area is apertured or cut out. Next, the displaced cardstock on the reverse side of the card is ground flush with the card surface leaving a web thickness of .002 inch at the bottom of the depression. Then suitable rollers are used to roll the .002 inch web to condense the web fibers down to a thickness of .001 inch, thus, leaving a more rigid and stronger ledge surrounding the aperture and which is deep enough to accommodate the 0.0055 inch silver film.

Accordingly, a principal object of the present invention is to provide a novel and improved card of the type described which meets the requirements set forth above and which is adapted to accommodate film inserts which may vary in thickness from about 0.003 inch to about 0.0055 inch.

A further object of the present invention is to provide a novel and improved method for producing film record cards of the type set forth above, which method combines the operations of embossing, scoring and grinding.

A still further object of the present invention is to provide a novel and improved method for producing film record cards of the type set forth above, which method combines the operations of embossing, grinding and rolling.

A still further object of the present invention is to provide a novel and improved method for producing film record cards of the type set forth above wherein grooving or indentation of the card on one side can easily be made much deeper by permitting the card to be embossed on the other side, the stamping or embossing operation producing a sort of bending or folding of the card material instead of compression thereof, and by removing the ridge-like embossed projection from the opposite surface of the card by a suitable cutting, shaving or grinding operation so as to restore the surafce on this side of the card to a planar condition.

The foregoing and other objects, features and advantages of the invention will be apparent from the following more particular description of preferred embodiments of the invention, as illustrated in the accompanying drawings.

In the drawings:

FIG. 1 is a diagrammatic illustration of the sequence of steps involved in preparing blank cards embodying the present invention in automated manner.

FIG. 2 is a partial plan view of a card showing the embossed and scored portion prior to being apertured.

FIG. 3 is a plan view of the chip burster mechanism.

FIGS. 14, 15 and 16 are sectional views showing successive steps of a second embodiment of a record card and method of making same embodying the principles of the present invention.

FIG. 17 is a sectional view showing the rolling operation on a card which has a trench-like embossment surrounding the area of the card to be apertured.

FIG. 18 is a detailed diagrammatic view of the embossing dies used to produce a trench or groove surrounding the area of the card to be apertured.

FIG. 19 is a sectional view of a card after embossment and scoring using the dies of FIG. 18.

Referring to FIG. 1, a stack of cards to be processed is indicated by the numeral 10. For example, these cards may be "punch" cards of the usual type employed with the IBM system of tabulating card machines, being formed of cardstock having a specified thickness of 0.007 inch. As will be understood, the stack of cards can be supported in any suitable magazine from which the cards are fed one by one in succession from the bottom of the stack in the direction indicated by the arrow 11, such feeding mechanisms being well known in the art. The cards may be fed, for example, at the rate of 500 cards per minute.

Figure 4:
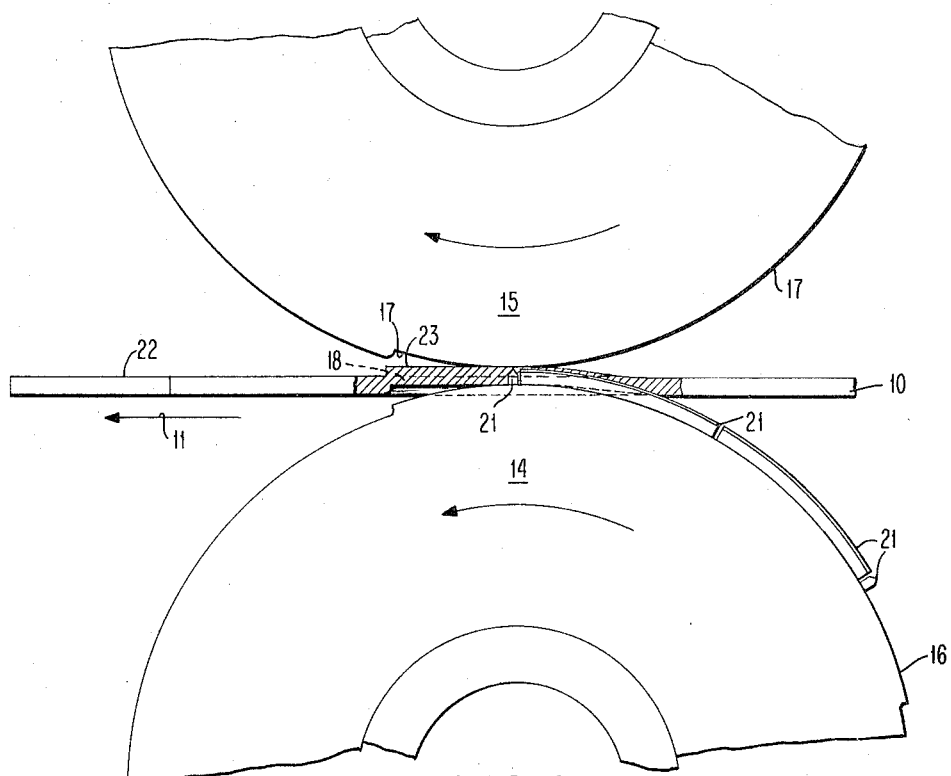
FIG. 4 is an enlarged elevation view of the embossing and scoring wheels.
Figure 5:
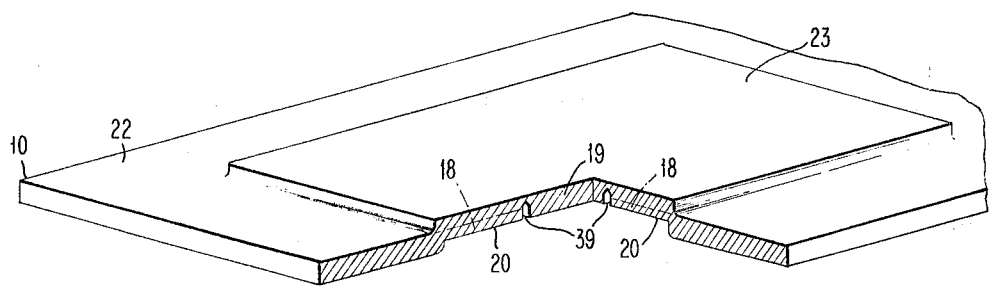
FIG. 5 is a cut-away perspective view showing the embossed and scored portion of a card.

As was previously mentioned, the first step according to the present invention comprises an embossing and scoring operation. The embossing and scoring operation is preferably performed by passing the cards in succession from a pair of feed rolls 12 and 13 and in between a lower embossing and scoring roll 14 and an upper backing or die roll 15. The embossing and scoring roll 14 is preferably made of steel or the like and includes a raised portion 16 having a height corresponding to the desired depth of the embossment to be made and a configuration corresponding to the desired configuration and area of the embossment to be made. The die roll 15 is also preferably made of steel or the like and includes a relieved die portion 17 which corresponds in configuration to and is adapted to receive the raised portion 16 of the embossing roll as the rolls rotate in the direction shown. As cards are fed between the rolls a selected area on each card will be displaced into the die portion 17, as shown in FIG. 4 and the mating portions 16 and 17 are preferably given a configuration which will provide a rectangular embossed or displaced area 18 on each card, as shown in FIGS. 2 and 5. Using the present technique, the embossed area may be carried to a depth of approximately 0.006 inch with the displaced cardstock protruding from the reverse face of the card an amount in the order of 0.0005 inch to 0.001 inch. The area of the embossment may, for example, be in the order of 2.0 inches by 1.56 inches which corresponds to the size of many film inserts presently in use.

Figure 6:
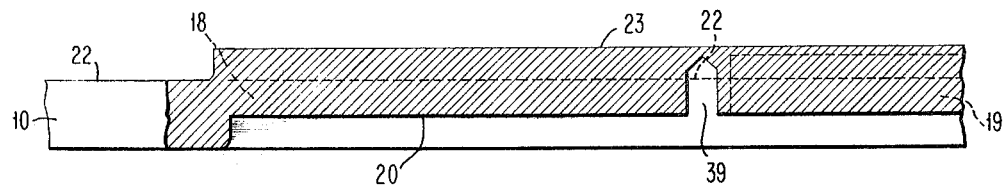
FIG. 6 is an enlarged sectional view showing the embossed and scored portion of the card of FIG. 5.

In accordance with another feature of the present invention, the embossed area 18 of each card is provided with a rectangular scored area 19 which is later removed to provide the card aperture. As shown in FIG. 2, the scored area 19 has the same configuration but is smaller in area than the embossed area so that when the scored area is removed a recessed shoulder or ledge 20 will remain onto which the film insert may be mounted and secured. To effect the scoring operation, suitable scoring knives 21 are arranged in rectangular fashion on the raised portion 16 of roll 14 so that scoring and embossing are carried out simultaneously. A small space is left between adjacent scoring knives to provide an interrupted score. As shown in FIGS. 5 and 6, the score is carried to a depth which extends beyond the normal plane 22 of the reverse side of the card but which falls short of the outer surface 23 of the displaced cardstock protruding from the reverse side of the card.

If desired, instead of using the solid raised portion 16 to emboss out the entire area 18, an embossing die of the type shown in FIG. 18 may be used. It comprises raised ribs 24 extending circumferentially of the roll 14 and parallel to but spaced from one another, the ends of these ribs being cross-connected by transverse ribs 25 so that the ribs together form a rectangular outline to be embossed in the card. In this case, the scoring knives 21 would be arranged around the inside perimeter of the ribs 24 and 25, and the relieved die portion 17 of the die roll 15 would be changed to correspond in configuration to and receive the raised ribs 24 and 25. FIG. 19 is a sectional view of a card 10a after embossment and scoring by the dies of FIG. 18 which produce a groove or trench-like depression 25a surrounding the area of the card to be apertured. The card material making up the bottom of the groove is displaced to form a ridge 25b which projects from the reverse side of the card. The scoring knives 21 produce an interrupted score or line of weakness 21a around the inner periphery of the bottom of the groove 25a. Score 21a would also be carried to a depth which extends beyond the normal plane 21b of the reverse side of the card but which falls short of the outer surface 25c of the displaced cardstock protruding from the reverse side of the card.

After having been embossed and scored, the cards are passed on by feed rolls 26 and 27 to a second set of rolls 28 and 29 which carry out the operation of removing the embossed ridges from the back of the card. The roll 28 takes the form of a grinding wheel which is provided with any wheel grit size and wheel hardness which is in the range suitable for grinding cardstock. The roll 29 functions as a vacuum backup roll and comprises a center portion which is stationary and an outer shell portion 30 which rotates around the center portion. The stationary roll portion includes a vacuum port 31 which communicates between a suitable source of vacuum (not shown) and a plurality of vacuum ports 32 in the outer shell 30. The ports 32 extend through a raised portion 33 of the shell, the raised portion having a configuration similar to the raised portion 16 of roll 14 and corresponding in area to the area of the displaced cardstock that is to be removed. The vacuum in ports 32 serves to hold the card tight and flat against the surface of the shell during grinding to insure a more accurate grinding operation.

Figure 7:
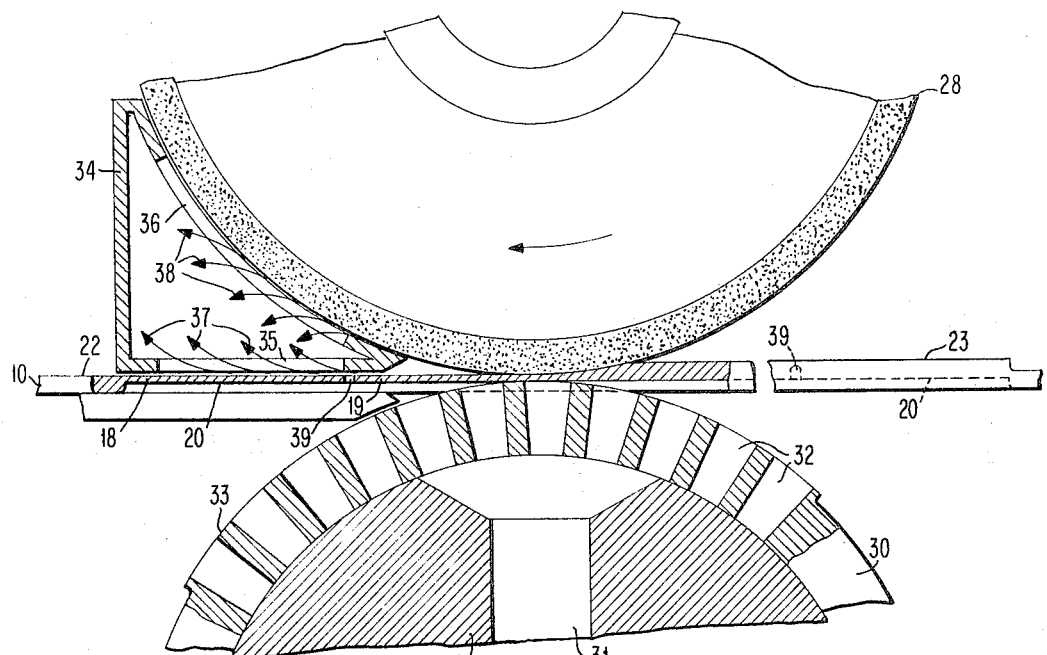
FIG. 7 is an enlarged sectional view showing the grinding wheel, the vacuum backup wheel and the vacuum chamber which make up the grinding station.
Figure 9:
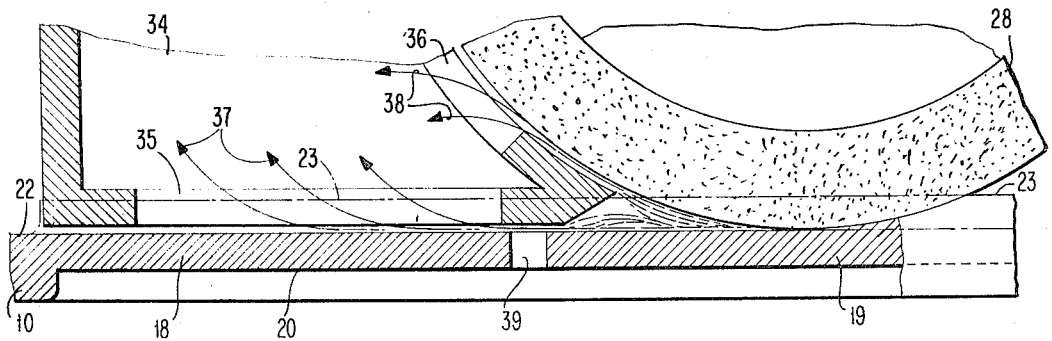
FIG. 9 is an enlarged sectional view showing the grinding process in more detail.

FIGS. 7 and 9 show in detail the coaction of the grinding wheel 28 and the raised backup portion 33 to remove the ridge-like projection 23 from the back of a card 10 passing therebetween. The rolls are arranged to provide a depth of grind which will render the ridge-like projection flush with the card surface leaving a thin web at the bottom of the depression which may vary in thickness from 0.001 inch to 0.0035 inch depending on the depth of the embossment.

Adjacent the card path on the exit side of the rolls 28 and 29 is a vacuum chamber 34 which is connected to a suitable source of vacuum (not shown). The chamber 34 is used to remove grinding lint from the ground surface of the card and also from the grinding wheel and, as shown, two openings 35 and 36 are provided in the chamber walls. The opening 35 is adjacent the card path and, as indicated by the directional arrows 37, lint from the card is sucked through the opening 35 and into the chamber.

Figure 8:
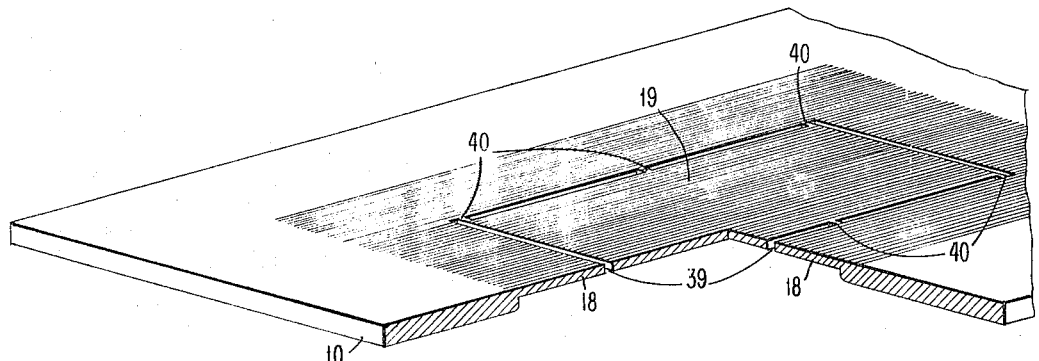
FIG. 8 is a cut-away perspective view showing the embossed portion of the card of FIG. 5 ground and the score changed to a perforation.

Referring to FIG. 8, there is shown the condition of a card after the embossing, scoring and grinding operations have been completed. It will be noted that the score 39, which when originally cut did not extend all the way through the embossed area, has now been converted to thru-perforations except for the tufts 40 which still hold the scored area 19 to the card.

After the cards are cleaned, they are passed by feed rolls 41 and 42 to a suitable mechanism for applying any kind of sealant coating to the ground area of the cards to make the area smoother and longer wearing. The mechanism may comprise, for example, a container 43 of sealant solution 44 which is fed by a wick 45 to a gravure roller 46 having a suitable pattern for applying the sealant only to the ground surface. The sealant solution 44 may comprise any of the known polymers which can be used as a lacquer. For example, polyvinyl alcohol or polyvinylidene chloride could be used as effective sealants for covering the ground surface of cardstock. Such a sealant covering also serves to seal in any dust and lint which may not have been vacuum removed from the ground area. This is important because free dust and lint can interfere with the circuit operation of machines which make use of these film record cards.

Next, the cards are fed to an adhesive applying mechanism where any suitable type of adhesive is applied to that portion of the embossed area 18 which surrounds the scored area 19 of the card. Preferably a non-tacky heat-sensitive adhesive substance is used, although a pressure-sensitive adhesive could also be used. The applicator mechanism may comprise a backing roll 47 and a gravure roll 48 between which the cards pass in succession, the gravure roll having a suitable pattern for applying the adhesive to the desired embossed area. A suitable container 49 is provided for the adhesive 50 and a supply roller 51 rotating partially submerged in the adhesive bath transfers the adhesive to the gravure roll.

After application of the adhesive, each card passes through a chip removal station where the scored area 19 of each card is removed. As shown in FIGS. 1 and 3, the removal mechanism comprises an L-shaped blade member 52 pivotally mounted at 53 and biased counter-clockwise by a spring 54 toward the card and an opening 55 in the card bed plate. As the cards pass through the station, the blade 52 forces the tufts 40 which hold the scored areas 19 to break causing the areas to separate from the cards. The separated chips are carried into a collection pocket by way of feed rolls 56 and 57.

Figure 10:
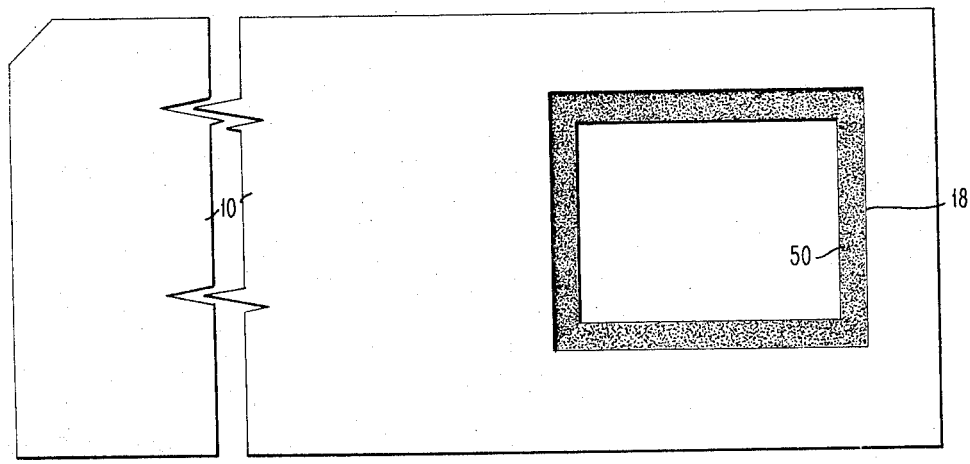
FIG. 10 is a plan view of one of the finished blank cards.

After the aperture forming operation, the cards are fed by feed rolls 58 and 59 and then deposited on a suitable card stacker 60. The cards are now in the form shown in FIG. 10 ready to have the film inserts secured to the adhesive coated shoulders therein by any suitable mounter device. Of course, the film inserts may be mounted by the manufacturer before shipment or by the customer after shipment. It will also be understood that the cards may be supplied to the customer in unapertured form simply by disabling the chip removal station. In unapertured form, the cards are better adapted for machine processing by the customer prior to mounting of the film inserts.

Figure 11:
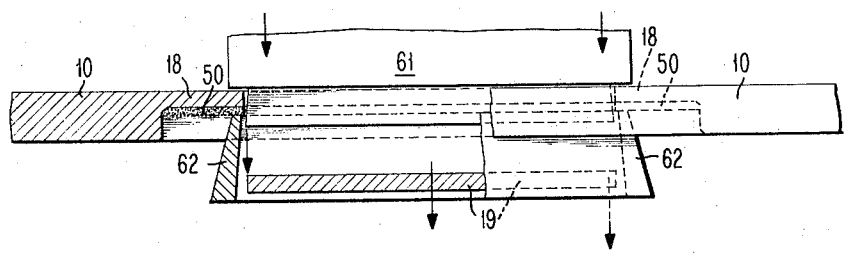
FIG. 11 illustrates diagrammatically an alternate way of cutting out the aperture in a blank card.

In mounting a desired section of film in an unapertured card of the type described, the first operation is to die out the aperture as indicated diagrammatically in FIG. 11 in which a suitable punch 61 punches out the section 19 through an opening in the base 62 by which the card 10 is supported. As shown, the dimensions of the opening in the base and of the punch are such that the cut is made through the thin web 18 and on the score line 39 (FIG. 8) surrounding the section 19, thus leaving the adhesive coated portion 50 of the web projecting into the aperture. If the customer apertures the cards, the cards may be shipped either with or without the score 39.

Figure 12:
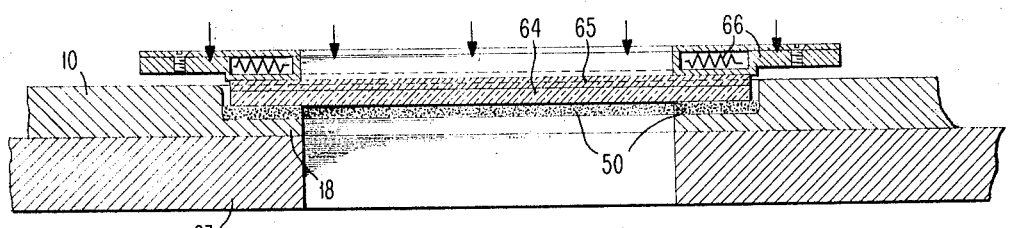
FIG. 12 shows the operation of bonding a section of film in place on the card.
Figure 13:
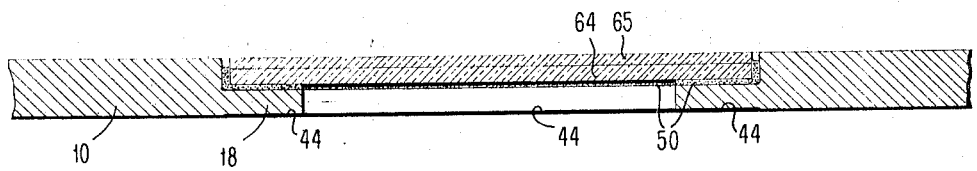
FIG. 13 shows the completed card with the film mounted therein.

After the aperture has been formed, the desired section of film is then brought to the position shown in FIG. 12. Here the card 10 rests on a supporting table 63 having an aperture of substantially the same size and shape as the card aperture bounded by the webs 18 which are overlapped by the edges of the film section. The film section is in direct contact with the coating 50 of adhesive material which is preferably applied to the bottom of the embossed area as already described. As shown in FIG. 12, the film comprises the usual base 64 coated with the usual emulsion 65 and is positioned with its edges overlapping the coated webs 18. Pressure and heat is then applied by means of any suitable heated platen 66, with the result that the webs 18 and the film itself are forced downwardly in the aperture in the card to a position substantially as indicated in FIG. 13 in which the outer surface of the emulsion side 65 of the film is substantially flush with the upper surface of the card. At the same time the outer surface of the base 64 of the film is bonded to the underlying webs 18 by virtue of the applied pressure and heat activation of the adhesive 50, and with accompanying thinning of the adhesive layer until said outer surface is substantially flush with the lower surface of the card for practical purposes. As an example, the total thickness of web (0.0015 inch) and of the film (0.0055 inch) is 0.007 inch which is within the prescribed tolerance limits of card thickness.

It will be understood that in producing a card having the trench-like embossment shown in card 10a of FIG. 19, that the ridge-like projections 25b would be ground flush with the surface 21b of the card and the gravure rolls 46 and 48 would be provided with the desired pattern for applying the sealant solution 44 only to the ground surface of the card and the adhesive coating only to the inside bottom of the trench 25a. If the card 10a is to be shipped to the customer in unapertured form, the chip removal station would be disabled and, if desired, the score knives 21 may be removed and the score 21a left out of the card. After the card is apertured and the film is mounted therein, the completed card will look the same as the completed card 10 shown in FIG. 13.

FIGS. 14, 15 and 16 show diagrammatically successive steps of a second embodiment of a record card and method of making same and embodying the principles of the present invention. As shown in FIG. 14, a card 67 is first embossed to displace the cardstock and cause it to protrude from the reverse side of the card as before with the embossed area preferably having a depth of 0.005 inch and the cardstock a thickness of 0.007 inch. An aperture is cut through the embossed area by any suitable means, which aperture is smaller in size than the size of the embossed area thus leaving a recessed shoulder surrounding the aperture.

Next the ridge-like protrusion on the back of the card is ground flush with the surface of the card, as shown in FIG. 15, leaving a thin web 68 surrounding the aperture and preferably having a thickness of 0.002 inch. After the grinding operation, the card is positioned between a suitable pressure roller 69 and a backup roller 70 and only the thin web portion 68 surrounding the aperture is subjected to rolling pressure sufficient to reduce the thickness of said web portion from 0.002 inch to 0.001 inch. The advantage gained by the novel rolling step is that the fibers of the thin web portion 68 are further condensed to give a stronger and more rigid shoulder for supporting a film insert of the silver film type a thickness of 0.0055 inch. Of course, the rolling step may be used to provide stronger and more rigid shoulders having a thickness greater than 0.001 inch depending on the thickness of the film to be mounted.

Following the rolling operation, any suitable means may be employed to apply a coating of adhesive material to the embossed thin web 68 and to bond a film insert thereto with the emulsion side of the film substantially flush with the surface of the card. The completed card 67 will look the same as the completed card 10 shown in FIG. 13.

FIG. 17 shows the rolling operation being applied to a card having a groove or trench-like embossment 71 of the type shown on card 10a of FIG. 19. The pressure roller 72 and backup roller 73 are provided with opposing raised portions 74 and 75 having the same configuration as the trench to be rolled.

While the invention has been particularly shown and described with reference to preferred embodiments thereof, it will be understood by those skilled in the art that the foregoing and other changes in form and details may be made therein without departing from the spirit and scope of the invention.

What is claimed is:
1. The method of preforming a record card for mounting a film or the like for use in card classification systems which comprises:
    forming a depression on one side of said card having an area and depth depending upon the area and thickness of a film to be mounted by displacing the card material in said area and causing same to protrude from the reverse side of said card;
    removing said protruding card material until it is flush with said reverse side of the card;

applying an adhesive coating to the perimeter of said depression; and blanking out the area surrounded by the perimeter of said depression to form a window for viewing a film seated on the resulting adhesive-coated perimetral depression.

2. The method of preforming a record card for mounting a film or the like for use in card classification systems which comprises:

embossing a depression on one side of said card having an area depending on the area of a film to be mounted and a depth which results in the displacement of the card material in said area and the protrusion of same from the reverse side of said card;

grinding said protruding card material until it is flush with said reverse side of the card;

applying an adhesive coating to the perimeter of said depression; and blanking out the area surrounded by the perimeter of said depression to form a window for viewing a film seated on the resulting adhesive-coated perimetral depression.

3. The method of preforming a record card for mounting a film or the like for use in card classification systems which comprises:

embossing a depression on one side of said card having an area depending on the area of a film to be mounted and a depth which results in this displacement of the card material in said area and the protrusion of same from the reverse side of said card;

grinding said protruding card material until it is flush with said reverse side of the card;

applying a sealant coating to the ground card material on said reverse side of the card;

applying an adhesive coating to the perimeter of said depression; and blanking out the area surrounded by the perimeter of said depression to form a window for viewing a film seated on the resulting adhesive-coated perimetral depression.

4. The method of preforming a record card for mounting a film or the like for use in card classification systems which comprises:

forming a depression on one side of said card having an area and depth depending upon the area and thickness of a film to be mounted by displacing the card material in said area and causing same to protrude from the reverse side of said card;

removing said protruding card material until it is flush with said reverse side of the card;

blanking out a central portion of said depressed area to form a window surrounded by a card shoulder having a reduced thickness which is less than the thickness of said card;

rolling said card shoulder to condense the card material therein and further reduce the thickness of said shoulder; and applying an adhesive coating to said card shoulder to which a film positioned over said window may be secured.

References Cited by the Examiner

UNITED STATES PATENTS

| 2,951,304 | 9/1960 | Herte | 40—158 |
| 2,977,017 | 3/1961 | Herzig | 156—108 |
| 3,103,756 | 9/1963 | Langan | 40—158 |
| 3,165,431 | 1/1965 | Askren | 156—108 |

BERNARD STICKNEY, *Primary Examiner.*

EUGENE R. CAPOZIO, *Examiner.*

W. J. CONTRERAS, *Assistant Examiner.*